United States Patent [19]

Takahashi et al.

[11] Patent Number: 4,779,274
[45] Date of Patent: Oct. 18, 1988

[54] REQUEST REPEAT METHOD FOR DATA COMMUNICATION

[75] Inventors: Chusei Takahashi; Hiroshi Etoh, both of Tokyo, Japan

[73] Assignee: Oki Electric Industry Co., Ltd., Osaka, Japan

[21] Appl. No.: 900,628

[22] Filed: Aug. 26, 1986

[30] Foreign Application Priority Data

Aug. 30, 1985 [JP] Japan ............................... 60-189767

[51] Int. Cl.$^4$ ............................................. G08C 25/02
[52] U.S. Cl. ...................................................... 371/32
[58] Field of Search ..................................... 371/32, 33

[56] References Cited

U.S. PATENT DOCUMENTS

| | | | |
|---|---|---|---|
| 4,054,949 | 10/1977 | Takezoe | 364/900 |
| 4,304,001 | 12/1981 | Cope | 371/8 |
| 4,422,171 | 12/1983 | Wortley | 371/32 |
| 4,551,834 | 11/1985 | Lienard | 370/94 |
| 4,584,684 | 4/1986 | Nagasawa | 371/33 |

FOREIGN PATENT DOCUMENTS 145751 8/1985 Japan .

Primary Examiner—Jerry Smith
Assistant Examiner—Robert W. Beausoliel
Attorney, Agent, or Firm—Wenderoth, Lind & Ponack

[57] ABSTRACT

A request repeat system for data communication in which the receiving station transmits a signal indicating the result of reception of data transmitted thereto from the transmitting station. The receiving station transmits a signal indicating the unsatisfactory data reception repeatedly N times at the maximum until the receiving station is able to receive the data normally to request the transmitting station to transmit the data again, when the receiving station does not receive the data in a prescribed time after the receiving station has transmitted the signal indicating the unsatisfactory reception of the data to the transmitting station. Thus, the request repeat system eliminates useless communication charge necessary for restarting data communication after interruption and repetition of operation for requesting the repeated transmission of data, and hence the request repeat system is particularly effectively applicable to mobile data communication.

10 Claims, 3 Drawing Sheets

FIG. I (A)
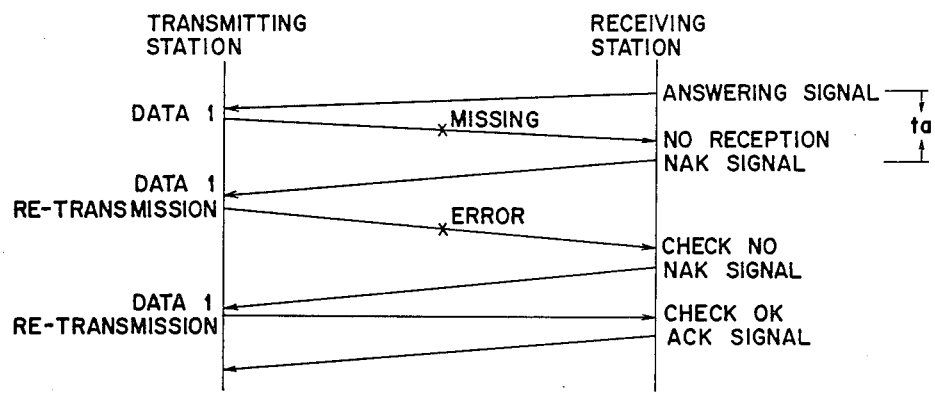
FIG. I (B)
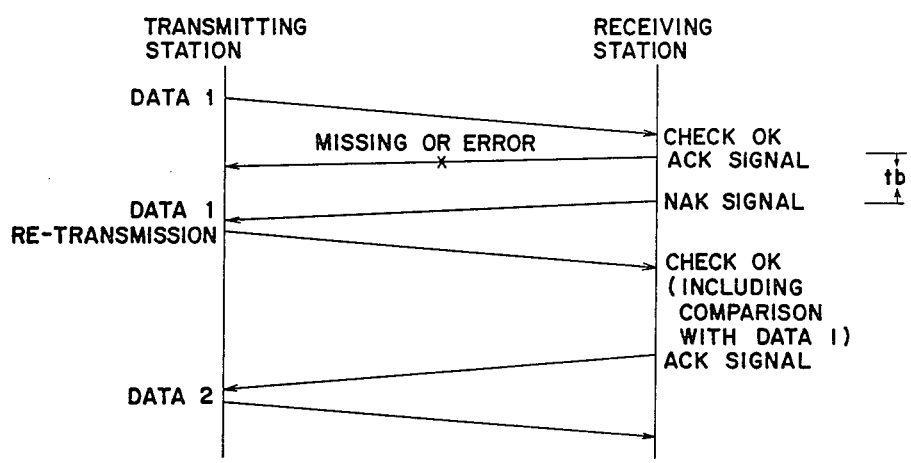

REQUEST REPEAT METHOD FOR DATA COMMUNICATION

BACKGROUND OF THE INVENTION

1. FIELD OF THE INVENTION:

The present invention relates to a request repeat method for correcting errors in data communication and more particularly, to a request repeat method suitable for mobile data communication.

2. DESCRIPTION OF THE PRIOR ART

Request repeat method for such a purpose are described, for example, in "Introduction to Data Transmission", H. Kawabata, Denki Tsushin Gijutsu News K.K., pp. 78 to 82, Apr. 20, 1970, and "Data Transmission Systems, New Edition", T. Fukushima, Sangyo Tosho K.K., pp. 216 to 218, Aug. 31, 1982. In the request repeat method described in these papers, the receiving station finds errors in data, and requests the transmitting station to repeat data transmission.

FIG. 2 illustrates a conventional transmission control procedure of a system which repeats data transmission after checking every block, in which the result of reception for every block is reported by the receiving station to the transmission station. Two kinds of codes, namely, "ACK" (acknowledged) and "NAK" (not acknowledged), are used for indicating the condition of the received data. After receiving the answer signal of the receiving station, the transmitting station transmits one data block to the receiving station and wait for the confirmation code. On the other hand, the receiving station inspects the data block by the CRC check method or the like and, if any error is found in the data block, the receiving station transmits the code NAK to the transmitting station. Then, the transmitting station, upon the reception of the code NAK, transmits the same data block again. Then, the receiving station inspects the data block again and, when the data block is correct, transmits the code ACK to the transmitting station. Thus, the condition of the data is identified by the codes for transmission of a correct data block.

The above mentioned conventional request repeat method has the following problems. A non-field state occurs for hundreds of milliseconds due to Rayleigh fading, which is specific to radio channels for mobile stations, or a hand-off operation for changing the channel from one to another in the overreaching section between radio zones in the public mobile telephone system. When the above mentioned request repeat method is employed for an ordinary frame configuration as shown in FIG. 3 in mobile data communication under such an environmental condition, a frame transmitted from the transmitting station will collectively loose the bit synchronization signal and the frame synchronization signal in the radio channel before the frame is inspected by the receiving station. Furthermore, the confirmation signals ACK and NAK are often missed to thereby interrupt the communication, and hence the request repeat system is unable to function properly.

SUMMARY OF THE INVENTION

Accordingly, it is an object of the present invention to provide a request repeat system for data communication, in which the receiving station transmits a signal indicating the result of reception of data transmitted thereto from the transmitting station to the transmitting station.

According to the present invention, when the receiving station does not receive a data from the transmitting station in a fixed time after transmitting a signal indicating the result of reception of the preceding data to the transmitting station during data communication, the receiving station repeats to transmit a signal (NAK) indicating the reception of defective data N times (N is an integer equal to or greater than one) at the maximum to the transmitting station until the receiving station receives data, to request the repetition of data transmission of the transmitting station. For example, upon the normal reception of data, the receiving station transmits the ACK signal indicating satisfactory (normal) data reception to the transmitting station by a conventional method. When the receiving station does not receive the next data in a fixed time after transmitting the ACK signal, the receiving station transmits NAK signal. If the receiving station still does not receive the next data after transmitting NAK signal, the receiving station transmits the NAK signal again. Thus the receiving station repeats to transmit the NAK signal N times at the maximum until the receiving station receives the next data so that data communication will not be interrupted.

The above and other objects, features and advantages of the present invention will become more apparent from the following description taken in conjunction with the accompanying drawings.

DESCRIPTION OF THE PREFERRED EMBODIMENTS

Figure 1:
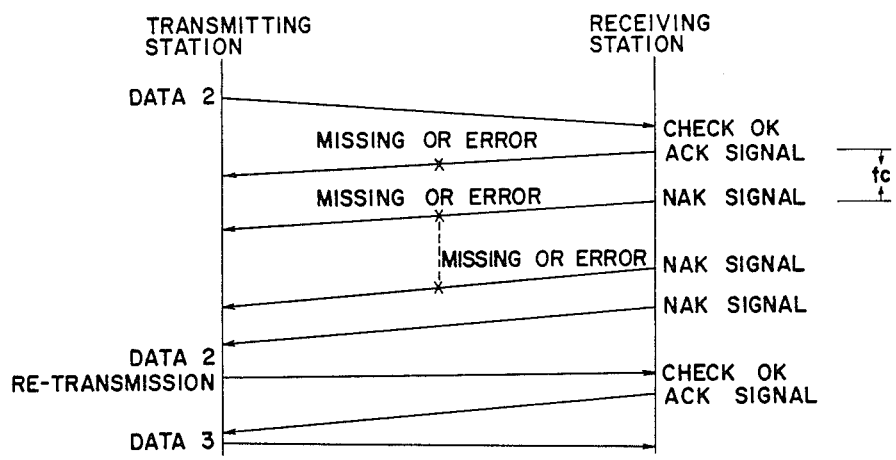
FIGS. 1a, 1b and 1c are diagrammatic illustrations of assistance in explaining the data transmission control procedures of a request repeat method embodying the present invention.
Figure 2:
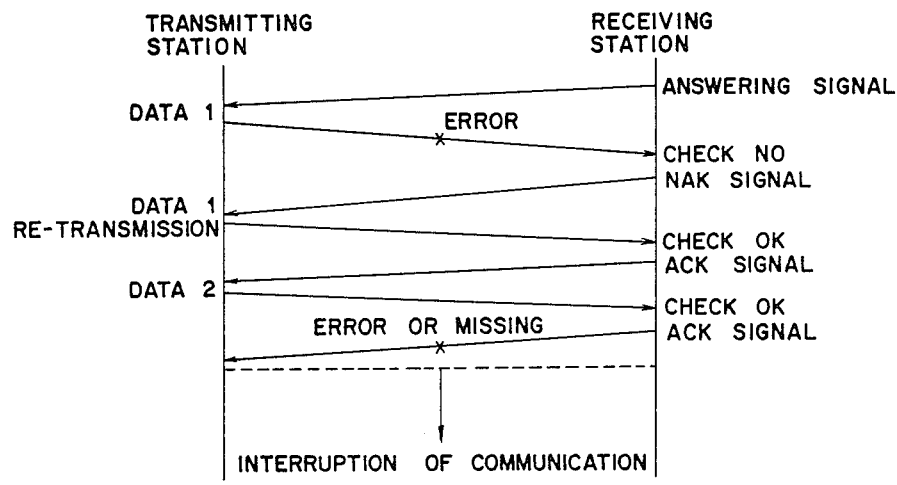
FIG. 2 is a diagrammatic illustration of assistance in explaining the data transmission control procedure of a conventional request repeat method.
Figure 3:
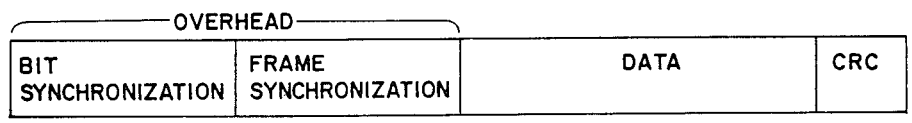
FIG. 3 is an illustration of a general frame configuration for data communication.

FIG. 1a illustrates a mode of data communication in which data 1 is not received normally by the receiving station due to fading in radio transmission or the collective instantaneous transmission interruption of the synchronizing signal by hand-off. In this case, the receiving station transmits the NAK signal after the passage of a time $t_a$ (answer signal transmission time + data transmission time + process time + redundancy time) corresponding to a time from the transmission of an answering signal from the receiving station to the arrival of data transmitted from the transmitting station at the receiving station. Upon the reception of the NAK signal, the transmitting station transmits the data 1 again to the receiving station. Then, the receiving station inspects the contents of the data 1 received for the second time and, if any error is found in the data 1, transmits the NAK signal again. If the receiving station is still unable to receive the data 1, the receiving station repeats to transmit the NAK signal N times.

FIG. 1b illustrates a mode of data communication in which the receiving station received the data 1 normally and transmits the ACK signal to the transmitting station, whereas the receiving station is still unable to receive the next data 2 because the ACK signal is missed due to instantaneous transmission interruption. In this case the receiving station transmits the NAK signal after the passage of a time $t_b$ (ACK signal transmission time + process time + data transmission time + redundancy time) corresponding to a time from the transmission of the ACK signal from the receiving station to the reception of the data 2 by the receiving station to request the transmitting station to transmit the data 1 again. Then, upon the normal reception of the data 1, the receiving station transmits the ACK signal and wait for the data 2.

FIG. 1c illustrates a mode of data communication under the particularly bad-condition of the radio channel, in which the ACK signal transmitted after the normal reception of the data 2 is missed due to instantaneous transmission interruption, and hence, the NAK signal transmitted after the time $t_b$ since the transmission of the ACK signal but is also missed, and in succession second NAK signal is transmitted after the passage of a time $t_c$ (NAK signal transmission time + process time + data transmission time + redundancy time) since the transmission of the preceding NAK signal. If the NAK signal is missed repeatedly, the NAK signal is transmitted repeatedly N times at the maximum until the receiving station is able to receive the data 2 normally.

In some cases, the overhead signals ACK and NAK are missed successively. Since the data communication control procedure for such a case is merely a combination of the data communication control procedures described with reference to FIGS. 1a and 1b, the description of the last case just mentioned above will be omitted.

As apparent from what has been described hereinbefore, according to the present invention, the receiving station transmits the NAK signal repeatedly when the overhead signals and/or the confirmation signals are missed or when errors are found in the data received by the receiving station, and hence the data communication is not interrupted and the receiving station is able to receive data surely. Accordingly, the present invention enables effective request repeat control in mobile data communication.

Figure 4:
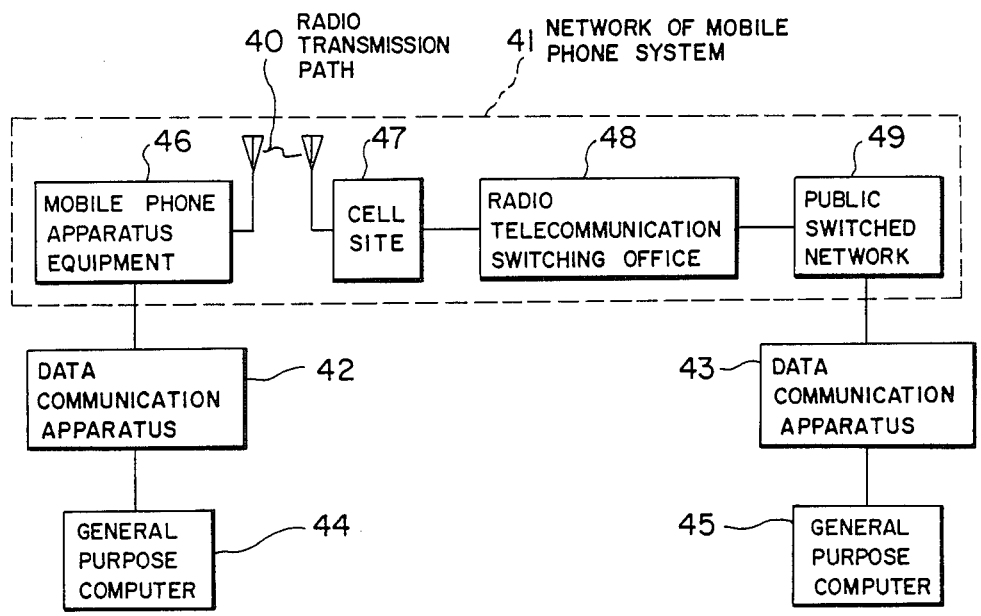
FIG. 4 is a schematic illustrating a network of a mobile phone system according to the present invention.

An exemplary mobile phone system according to the present invention will be described. Referring to FIG. 4, a network of the mobile phone system of the present invention is depicted. As shown in the same figure, designated at 41 is the network of the mobile phone system, 40 is a radio transmission path, 42 and 43 are respectively a bidirectional data communication apparatus according to the present invention, 44 and 45 are respectively a general purpose computer, 46 is a mobile phone unit, 47 is a cell site, 48 is a mobile telecommunication switching office, and 49 is a public switched telephone network.

Here, the data communication apparatuses 42 and 43 control coding and decoding for error correction, checks of received data, request repeat control of the present invention, and modulation and demodulation.

Figure 5:
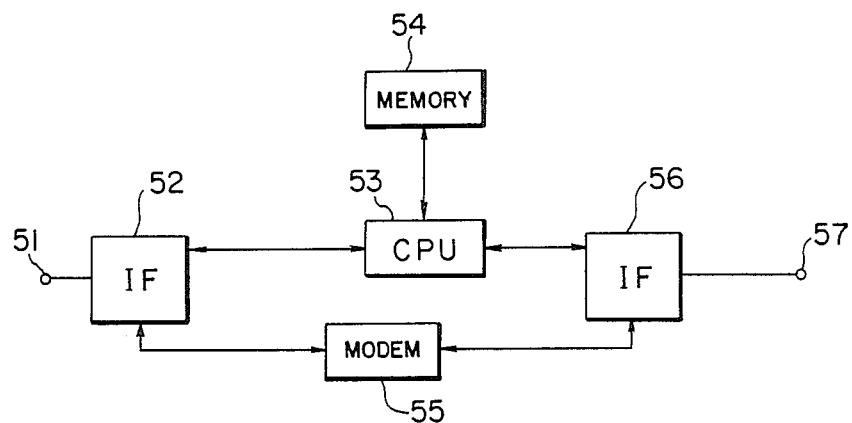
FIG. 5 is a block diagram illustrating a data communication equipment for use in the system of FIG. 4.

Referring to FIG. 5, a block diagram of the data communication apparatus is depicted. In the figure, designated at 51 is a connection terminal with the computer 44 or 45, 53 is a CPU, 54 is a memory having transmission procedures stored therein including a method request repeat control of the present invention, 55 is a modem, 57 is a connection terminal to the mobile phone system network, 52 is an interface circuit for connecting between the CPU 53 and the modem 55, and 56 is an interface circuit for connecting a connection terminal 57 to the CPU 53, the modem 55, and the mobile phone system network.

Operation of the data communication apparatuses 42 and 43 according to the present invention in data communication apparatuses 42 and 43 according to the present invention in data communication between the computers effected with the system arrangement of FIG. 4 will be described.

In transmitting any data from the computer 44 to the computer 45 shown in FIG. 4 the computer 44 first transmits the data to the data communication apparatus 42.

As shown in FIG. 5, the data is received by the terminal 51 in conformity with a transmission procedure programmed previously in the memory 4, and furthermore received by the CPU 53 via the interface circuit 52 wherein it is added with an error correcting code, and the like. The coded data is sent to the modem 55 via the interface circuit 52, converted there to a FSK signal and delivered to the system of FIG. 4 as an analog signal via the interface 56.

While, the data communication apparatus 43 receives data sent from the system network 41 as shown in FIG. 5, the coded data sent from the system network 41 is received by the terminal 57 in accordance with the transmission procedure of the present invention programmed previously in the memory 54.

The data received as such is A/D-converted by the modem 55 via the interface 56 and received by the CPU 53 as a digital signal. The data is thereafter subjected to error correction and a check that the data is correct. Provided there is found any error in the data in this checking step, the CPU 53, after taking prescribed timing of the present invention stored in the memory 54, transmits a NAK signal to the data communication apparatus 42 on the transmitting side by one time or a plurality of times.

Moreover, the CPU 53, when the received data is correct, transmits an ALK signal in the same procedure as that of transmitting the data in the data communication apparatus 42.

The data communication apparatus 42 receives the ACK or NACK signal so transmitted in the same procedure as that of receiving the data, and judges, upon recognition of the ACK or NACK signal by the CPU 53, whether or not it should receive data request repeat or new data from the computer 44.

Furthermore, in sending the same data from the computer reverse operation to the above description should be effected.

According to the present invention applied to such a system, data communication is prevented from being interrupted due to any occurrence of a burst error caused by fading.

In addition, the present invention eliminates useless communication charge necessary for restarting data communication after interruption and repetition of operation for requesting the repeated transmission of data. Therefore, the present invention is particularly effectively applicable to data communication and facsimile communication using the public mobile telephone system.

Although the invention has been described in its preferred form with a certain degree of particularity, it is to be understood that many variations and changes are possible in the invention without departing from the scope and spirit thereof.

What is claimed is:

1. A request repeat method for data communication comprising the steps of:
    (a) transmitting answering signal from a receiving station indicating readiness of reception of data;
    (b) transmitting a data from a transmitting station to a receiving station;
    (c) transmitting an ACK signal from said receiving station indicating a satisfactory reception of said data upon inspection of said data transmitted from said transmitting station to said receiving station;
    (d) transmitting from said receiving station an NAK signal indicating the unsatisfactory reception of said data requesting to transmit said data again, when said data is not received by said receiving station in a fixed time after the receiving station transmitted said ACK signal to said transmitting station because the ACK signal has been missed due to an instantaneous transmission interruption or if an error has been found in said data;
    wherein said NAK signal is repeatedly issued N times at the maximum number of issues until said receiving station is able to receive said second data when the transmission of the NAK signal or data has been missed repeatedly.

2. A request repeat method for data communication according to claim 1, wherein said NAK signal is issued after the passage of a fixed time during which the ACK signal transmitted by said receiving station has not been received by said transmitting station because the ACK signal has been missed due to an instantaneous transmission interruption or if an error has been found in said data and next data is not received by said receiving station.

3. A request repeat method for data communication according to claim 2, wherein operation for error correction effected by the receiving and transmitting sides is successively performed in repetition until the transmitting side receives an ACK signal from the receiving side.

4. A request repeat method for data communication according to claim 1, wherein said NAK signal is repeatedly issued after the passage of a fixed time when ACK first data is normally received but second data is not received by said receiving station because the ACK signal has been missed due to an instantaneous transmission interruption or if an error has been found in said data.

5. A request repeat method for data communication according to claim 4, wherein operation for error correction effected by the receiving and transmitting sides is successively performed in repetition until the transmitting side receives an ACK signal from the receiving side.

6. A request repeat method for data communication according to claim 1, wherein said transmitting station consists of a data communication apparatus for coding and decoding any transmition data for error correction, checking received data, controlling request repeat processing, and modulating and demodulating a radio wave signal carrying the transmission data, a general purpose computer connected with said data communication apparatus for adding an error correcting code, a check code, and the like to the transmission data.

7. A request repeat method for data communication according to claim 6, wherein operation for error correction effected by the receiving and transmitting sides is successively performed in repetition until the transmitting side receives an ACK signal from the receiving side.

8. A request repeat method for data communication according to claim 1, wherein said receiving station consists of data communication apparatus for coding and encoding received transmission data for error correction, checking said data, controlling requesting repeat processing, and modulating and demodulating a radio wave signal carrying said transmission data, a general purpose computer connected with said data communication apparatus for effecting error correction and checks that the received data is correct, and transmiting a NAK signal by one time or plurality of times to said transmitting station after prescribed timing in accordance with predetermined transmission procedure of the present invention provided there is any error in the received transmission data, while transmitting an ACK signal to the transmitting side provided there is no error in the received transmission data.

9. A request repeat method for data communication according to claim 8, wherein operation for error correction effected by the receiving and transmitting sides is successively performed in repetition until the transmitting side receives an ACK signal from the receiving side.

10. A request repeat method for data communication according to claim 1, wherein operation for error correction effected by the receiving and transmitting sides is successively performed in repetition until the transmitting side receives an ACK signal from the receiving side

* * * * *